United States Patent
Sterchak

(10) Patent No.: US 7,607,610 B1
(45) Date of Patent: Oct. 27, 2009

(54) ORNITHOPTER HAVING A WING STRUCTURE AND A MECHANISM FOR IMPARTING REALISTIC, BIRD-LIKE MOTION THERETO

(75) Inventor: Robert Sterchak, P.O. Box 1, Masonville, NY (US) 13804

(73) Assignee: Robert Sterchak, Masonville, NY (US)

( * ) Notice: Subject to any disclaimer, the term of this patent is extended or adjusted under 35 U.S.C. 154(b) by 281 days.

(21) Appl. No.: 11/788,935

(22) Filed: Apr. 23, 2007

(51) Int. Cl.
B64C 33/02 (2006.01)

(52) U.S. Cl. .............................. 244/72; 244/11; 244/22; 446/35

(58) Field of Classification Search .................... 244/11, 244/22, 28, 72; 446/35, 36, 37
See application file for complete search history.

(56) References Cited

U.S. PATENT DOCUMENTS

| | | | | |
|---|---|---|---|---|
| 1,090,609 A | * | 3/1914 | Furney | 244/22 |
| 1,338,025 A | | 4/1920 | Lind | |
| 1,622,629 A | | 3/1927 | Ehrlich | |
| 1,679,356 A | * | 8/1928 | Grunewald | 244/22 |
| 1,743,516 A | * | 1/1930 | Andrews | 244/22 |
| 1,835,630 A | | 12/1931 | Bowlus | |
| 2,021,627 A | * | 11/1935 | Gilpin | 244/22 |
| 2,820,601 A | | 1/1958 | Crawford | |
| 3,307,358 A | | 3/1967 | Kerandron | |
| 4,139,171 A | * | 2/1979 | Harris | 244/22 |
| 4,712,749 A | * | 12/1987 | Fox | 244/22 |
| 6,206,324 B1 | * | 3/2001 | Smith | 244/72 |
| 6,346,025 B1 | | 2/2002 | Tachau et al. | |
| 6,540,177 B2 | * | 4/2003 | Woo et al. | 244/11 |
| 6,565,039 B2 | | 5/2003 | Smith | |
| 6,568,634 B2 | | 5/2003 | Smith | |
| 6,783,097 B1 | | 8/2004 | Smith | |
| 6,840,477 B2 | | 1/2005 | Hamamoto et al. | |
| 6,926,230 B2 | * | 8/2005 | Ohta et al. | 244/22 |
| 2008/0272231 A1 | * | 11/2008 | Sinclair | 244/72 |

\* cited by examiner

*Primary Examiner*—Michael R Mansen
*Assistant Examiner*—Brian M O'Hara
(74) *Attorney, Agent, or Firm*—Mark Levy; Hinman, Howard & Kattell LLP

(57) ABSTRACT

An ornithopter having segmented, flapping wings and capable of bird-like flight. A main drive system provides flapping motion to the wings. Servo systems are provided for independently moving each wing forward and backward along a major axis of the aircraft fuselage, thereby providing a balance subsystem. A single servomechanism controls upward and downward direction of the wings thereby providing a center angle control subsystem. Two additional servo systems are provided to control a tail assembly that provides steering and other ancillary control functions. Each subsystem is controlled by a dedicated, onboard microcontroller. One embodiment of the aircraft is remotely controlled by a wireless data communication link. The aircraft may be constructed to resemble a natural bird, in both static appearance and flight characteristics. The aircraft may be scaled from model size to a full-size, passenger carrying aircraft.

13 Claims, 15 Drawing Sheets

ORNITHOPTER HAVING A WING STRUCTURE AND A MECHANISM FOR IMPARTING REALISTIC, BIRD-LIKE MOTION THERETO

FIELD OF THE INVENTION

The invention pertains to ornithopters and, more particularly, to a wing structure, a mechanism for imparting realistic, bird-like motion to the wing structure and to an ornithopter incorporating the wing and motion-imparting mechanism.

BACKGROUND OF THE INVENTION

As long as man has gazed skyward and observed birds, he has dreamed of flying. Until comparatively recently, such flight was assumed to be possible only by creating a bird-like structure with flapping wings. The very word ornithopter is derived from the Greek words ornithos meaning bird and pteron meaning wing. In other words, and ornithopter is a device with bird-like, flapping wings.

The concept is not new. The idea of imitating the flights of birds may date back to the Greek legend of Daedalus and Icarus, or perhaps even earlier. However, in approximately 1260, Roger Bacon wrote about the technology of such flight. In the late fifteenth century, Leonardo Da Vinci proposed the concept. Although a workable (i.e., flying) model of his design was, as far as is known, never built, his designs provide the first rigorous, scientific approach to the problem of human, bird-like flight.

Around 1870 in France, Gustav Trouve constructed an ornithopter and managed to fly it approximately 70 meters in a demonstration before the French Academy of Science. Shortly thereafter, Jobert constructed a model of a small bird powered by a rubber band. Many others soon followed with other designs. In the 1890s, Lawrence Hargrave constructed several ornithopters using either steam or compressed air as a power source.

While attention soon turned to fixed-wing aircraft, there were ongoing attempts to create functional, practical ornithopters. Notable among the twentieth century pioneers were Alexander Lippish, Adalbert Schmid and, more recently, James DeLaurier and his team at the University of Toronto.

Ornithopter is a term applied to non-fixed wing aircraft that derives all propulsion from the movement of wings, not from rotors, propellers, or reaction engines. Ornithopters differ in many aspects from fixed-wing aircraft. The greatest difference is that the propelling airfoils utilize reciprocal motion rather than the rotary motion of a propeller or, in the case of helicopters, a rotating wing. The driving airfoils are typically large to interact with a large volume of air, thereby maximizing the generated thrust. The flapping airfoils typically produce both lift and thrust. Consequently, drag-inducing structures common on fixed-wing aircraft may be minimized or eliminated providing theoretically high overall efficiency to ornithopters. Ornithopters do not have control surfaces as commonly used in fixed wing aircraft. Rather, flight control is accomplished by reconfiguring the airframe in a coordinated way, such that the forces active in and on the device produce stable, predictable flight. Possible motions include vertical takeoff and landing, hovering, normal forward flight and gliding.

Ornithopters may be manned or unmanned and range in size from small aircraft models for hobby, recreation, sport and research, and for interacting with wildlife to large, passenger carrying aircraft.

Overall, ornithopters can achieve higher overall efficiency than rotating propeller aircraft. However, the ornithopter body typically rotates counter to the motion of the wing resulting in a motion variously described as heaving, lurching and rising and falling. Such motion has the potential to cause discomfort to passengers carried aboard. It is this single factor, along with the complexity of the required wing and drive mechanisms, that appears to have limited commercial development of the ornithopter as a passenger carrying aircraft.

DISCUSSION OF THE RELATED ART

U.S. Pat. No. 1,338,025 for FLYING MACHINE, issued Apr. 27, 1920 to Otto S. Lind discloses an aircraft having substantially fixed wings. The LIND wings flap but no control of wing geometry, orientation, etc. is provided.

U.S. Pat. No. 1,622,629 for AIRCRAFT WITH SWINGING WINGS, issued Mar. 29, 1927 to A. Ehrlich shows an aircraft with wings that flap but again, no control of wing geometry, orientation, etc. is provided.

U.S. Pat. No. 1,835,630 for AIRPLANE, issued Dec. 8, 1931 to Glenn H. Bowlus teaches an aircraft having a slight control of wing pitch, allowing the wings to move to provide propulsion.

U.S. Pat. No. 2,820,601 for MOVABLE WING TIP, issued Jan. 21, 1958 to James E. Crawford teaches an aircraft wing having a movable tip providing a wing extension useful as a control surface.

U.S. Pat. No. 3,307,358 for DEVICE FOR PROPELLING OR PUMPING A FLUID AND APPLICATION THEREOF TO THE PROPULSION OF SHIPS, issued Mar. 7, 1967 to 0. G. De La Roche Kerandron shows a scotch yoke to convert rotary motion to reciprocating motion.

U.S. Pat. No. 4,712,749 for MEANS AND METHODS FOR CONTROLLING ORNITHOPTERS, issued Dec. 15, 1987 to Duke Fox discloses an aircraft having wings that exhibit a flap stroke. No way of adjusting the center of balance is provided and the flap axis of the wings never changes.

U.S. Pat. No. 6,206,324 for WING-DRIVE MECHANISM, VEHICLE EMPLOYING SAME, AND METHOD FOR CONTROLLING THE WING-DRIVE MECHANISM AND VEHICLE EMPLOYING SAME, issued Mar. 27, 2001 to Michael J. C. Smith discloses a wing drive mechanism that provides independent wing motion around three independent axes (i.e., three rotational degrees of freedom).

U.S. Pat. No. 6,346,025 for METHOD AND SYSTEM FOR JOINTS USABLE IN TOYS, issued Feb. 12, 2002 to Jeremy Tachau et al. teaches a joint allowing movement of one member with multiple degrees of freedom relative to a second member.

U.S. Pat. No. 6,565,039 for WING-DRIVE MECHANISM AND VEHICLE EMPLOYING SAME, issued May 20, 2003 to Michael J. C. Smith discloses a wing drive mechanism that provides independent wing motion around three independent axes (i.e., three rotational degrees of freedom). A fuzzy logic or neural network is used to provide complex control of sophisticated trajectories.

U.S. Pat. No. 6,568,634 for WING-DRIVE MECHANISM AND VEHICLE EMPLOYING SAME, issued May 27, 2003 to Michael J. C. Smith discloses another wing drive mechanism that provides independent wing motion around three independent axes (i.e., three rotational degrees of freedom). A fuzzy logic or neural network is used to provide complex control of sophisticated trajectories.

U.S. Pat. No. 6,783,097 for WING-DRIVE MECHANISM AND VEHICLE EMPLOYING SAME, issued May 20, 2003 to Michael J. C. Smith discloses yet another wing drive mechanism that provides independent wing motion around three independent axes (i.e., three rotational degrees of freedom). A fuzzy logic or neural network is used to provide complex control of sophisticated trajectories.

U.S. Pat. No. 6,840,477 for FLUTTERING WING-OPERATED FLYING MOVING APPARATUS, issued Jun. 11, 2005 to Masaki Hamammoto et al. teaches a fluttering apparatus having a main body portion having wings having a front wing shaft, a rear wing shaft and a wing film spread over the front and rear wing shafts. A first rotary actuator drives the front wing shaft and a second rotary actuator drives the rear wing shaft. The front and wing shafts reciprocate in a plane orthogonally crossing an axis of rotation with the actuator serving as the fulcrum.

None of these patents taken individually or in any combination is seen to teach or suggest the wing structure, the mechanism for imparting realistic, bird-like motion thereto, or the ornithopter incorporating the wing structure of the present invention.

SUMMARY OF THE INVENTION

In accordance with the present invention, there is provided an ornithopter having segmented, flapping wings and capable of bird-like flight. A main drive system imparts flapping motion to the wings. Servo systems are provided for independently moving each wing forward and backward along a major axis of the aircraft fuselage, thereby providing a balance subsystem. A single servomechanism controls upward and downward direction of the wings thereby providing a center angle control subsystem. Two additional servo systems are provided to control a tail assembly that provides steering and other ancillary control functions. Each subsystem is controlled by a dedicated, onboard microcontroller. One embodiment of the aircraft is remotely controlled by a wireless data communication link. The aircraft may be constructed to resemble a natural bird, in both static appearance and flight characteristics. The aircraft may be scaled from model size to a full-size, passenger carrying aircraft.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention provides a mechanism for providing realistic, life-like motion to a wing and to an aircraft capable of flight using a flapping wing motivated by the inventive mechanism. A control mechanism for the wing-flapping mechanism is also provided.

The ornithopter of the present invention requires several mechanical and electronic systems to make flight possible. Cumulatively, these systems may have significant weight. It should be remembered, however, that although light in weight, birds are not weightless. A Canada goose, for example, can weigh as much as 20 pounds, yet flies impressively. What does matter is wing loading and providing enough power (e.g., thrust) to impart the necessary lift.

Figure 1A:
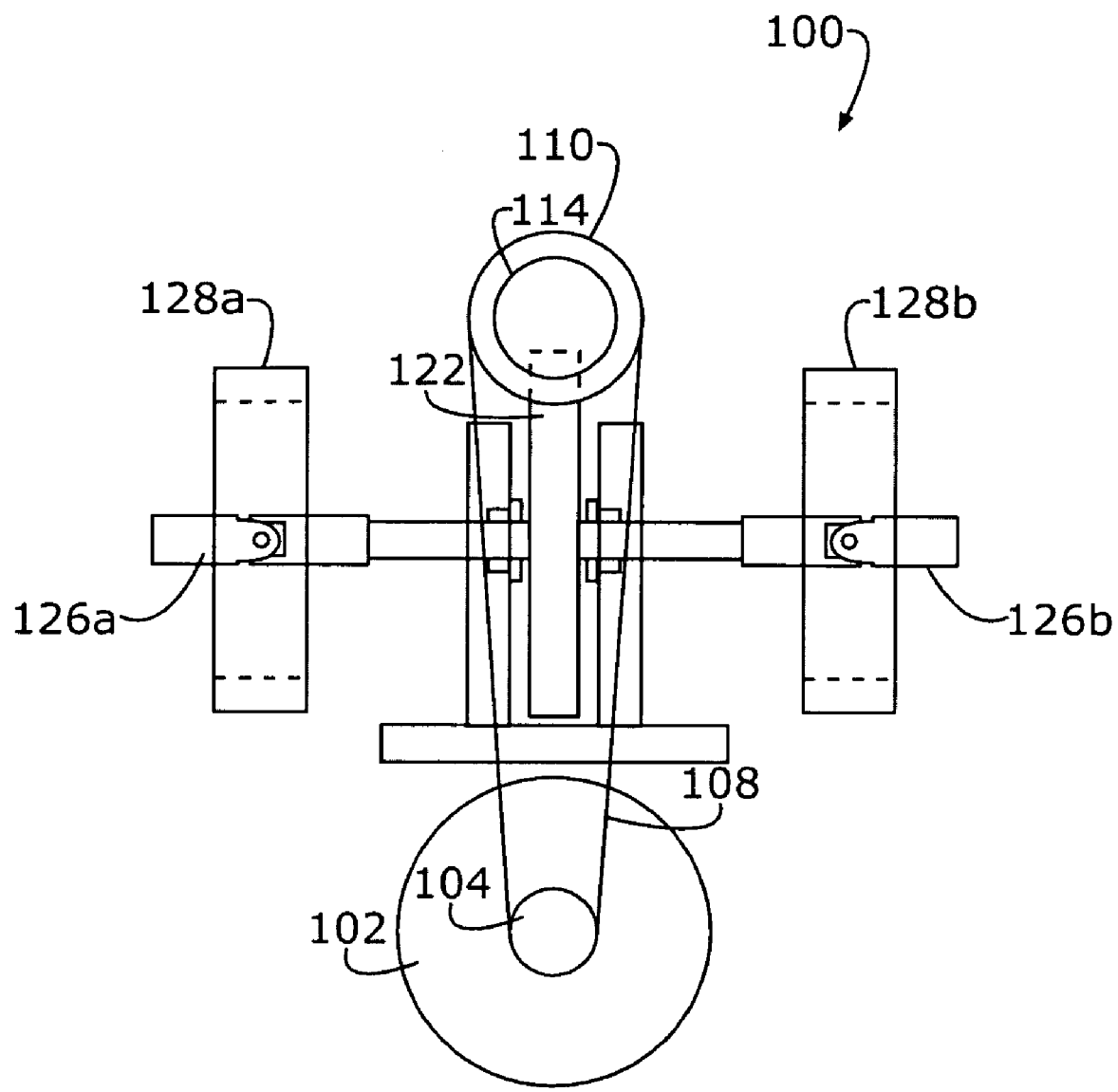
FIGS. 1a and 1b are rear elevational and side, elevational schematic views, respectively, of the main drive system of the aircraft of the present invention.
Figure 1B:
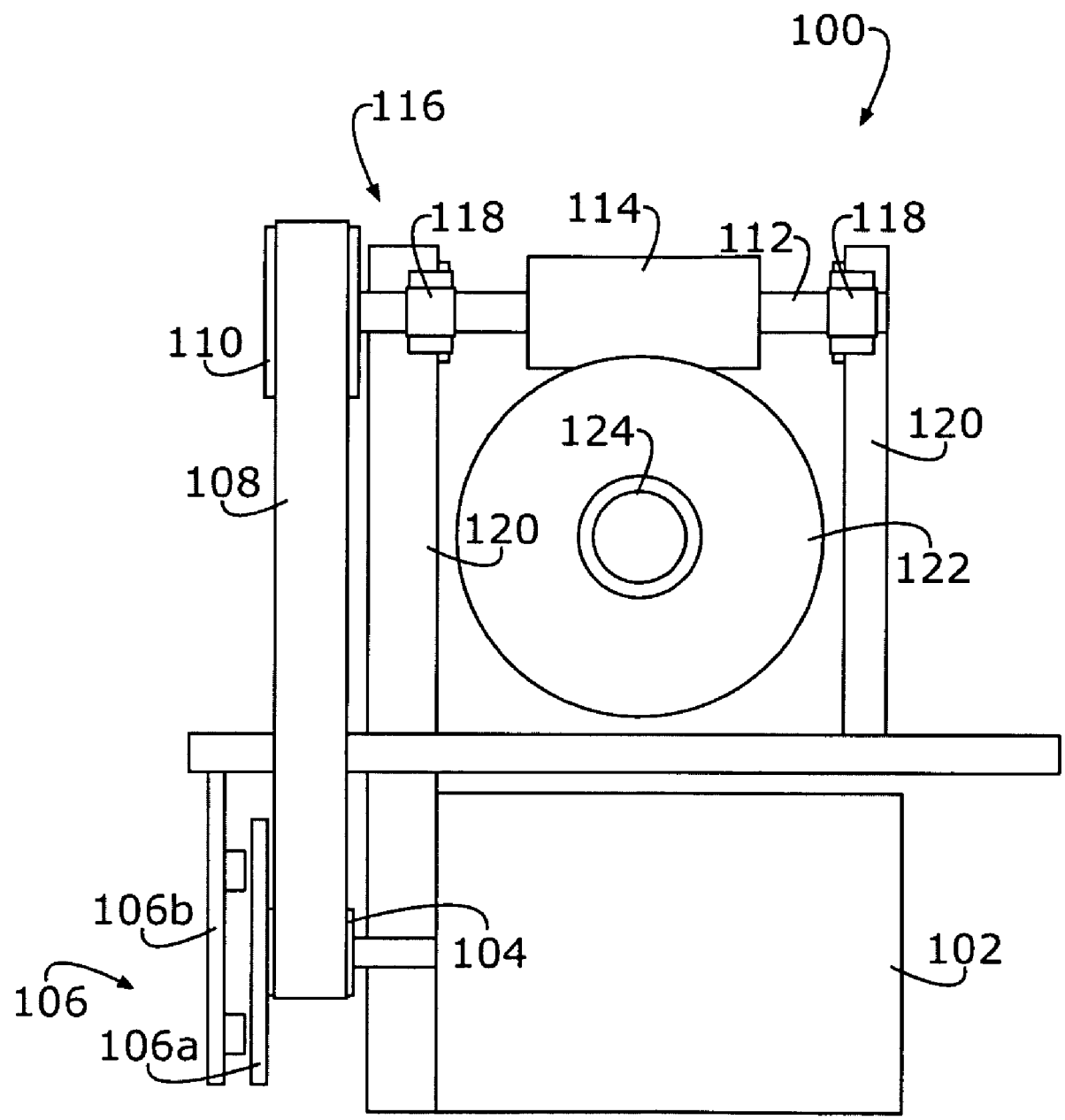

The major systems needed to enable flight include a main drive system used to provide up-and-down flapping motion to the aircraft wings, thereby generating thrust. Referring first to FIGS. 1a and 1b, there are shown rear and right side, elevational schematic views, respectively, of the main drive system of the aircraft of the present invention, generally at reference number 100.

A main drive motor 102 is aligned substantially parallel to a major axis of the aircraft frame, not shown. In the embodiment chosen for purposes of disclosure, main drive motor 102 is a high-speed, brushless DC motor (BDCM) having a maximum speed of approximately 33,000 RPM. An optical encoder 106 includes a code disc 106a and a circuit board assembly 106b that includes a reflective photo detector, not shown. Optical encoder 106 is operatively attached to the shaft of main drive motor 102. BDCMs are noted for both their high power-to-weight ratios and the high speeds, making them logical choices for the application.

A first, lower toothed pulley 104 is attached to the shaft of main drive motor 102. An upper toothed pulley 110 is connected to lower toothed pulley 104 by a cog (timing) belt 108. Upper toothed pulley 110 is disposed upon a proximal end 116 of worm shaft assembly 112. Worm shaft assembly 112 is supported by bearings 118 that, in turn, are supported in an upward-extending portion of frame 120.

A worm 114 is disposed on worm shaft 112 proximate a central region thereof. Worm 114 interacts with a worm gear 122 on main shaft 124. Worm gear 122 and main drive shaft 124 are disposed substantially perpendicularly to worm 114 and worm shaft 112. Both proximal and distal ends of main drive shaft 124 terminate at input sides of universal joints 126a, 126b that are disposed within central openings gimbal blocks 128a, 128b, respectively. Main drive shaft 124 carrying worm gear 122 is suitably supported and journaled using techniques believed to be well known to those of skill in the art and not further described herein.

Figure 2:
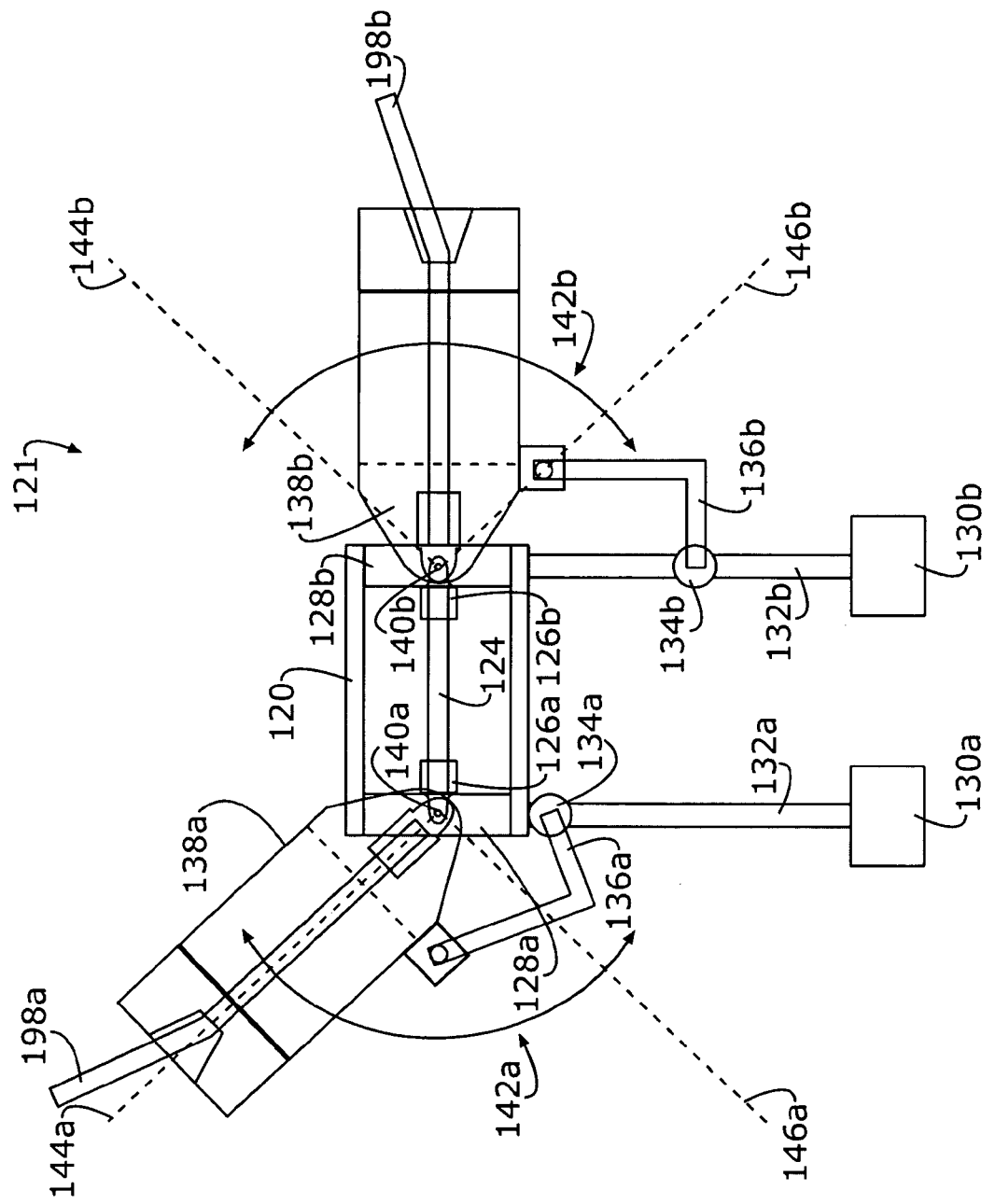
FIG. 2 is a detailed, top plan, schematic view of the balance subsystem of the aircraft of the invention.

Referring now to FIG. 2, there is shown a detailed, top plan view of gimbals 128a, 128b of the balance subsystem 121 of the inventive aircraft. Main drive shaft 124 is shown, albeit absent second worm gear 122 (FIGS. 1a, 1b), connected to universal joints 126a, 126b within gimbal blocks 128a, 128b, respectively.

A pair of left and right stepper motors 130a, 130b drive respective lead screws 132a, 132b. Lead screw followers 134a, 134b are disposed on lead screws 132a, 132b, respectively. Proximal ends of balance links 136a, 136b are connected to lead screw followers 134a, 134b. Distal ends of balance links 136a, 136b are connected to shaft directors 138a, 138b.

Shaft directors 138a, 138b are pivotally connected to respective ones of gimbal blocks 128a, 128b at pivots 140a, 140b. The travel of shaft directors 138a, 138b is shown by respective arcs 142a, 142b. Forward travel limits are indicated by lines 144a, 144b and aft travel limits by lines 146a, 146b. As seen in FIG. 2, the left shaft director 138a is shown substantially fully forward with lead screw follower 134a at its forwardmost position. Right shaft director 138b is shown at a midpoint with lead screw follower 134b disposed at a midpoint of lead screw 132b.

The balance mechanism 121 defined by gimbals 128a, 128b, shaft directors 138a, 138b, balance links 136a, 136b and universal joints 126a, 126b allows transmission of the rotary motion of main shaft 124 to be transmitted to wings 184a, 184b (FIG. 4) regardless of the position thereof. Suitable drivers and microprocessor described in detail hereinbelow are provided to actuate stepper motors 130a, 130b as required to impart necessary forward/backward position to wings 184a, 184b (FIG. 4) through shaft directors 138a, 138b attached to gimbal blocks 128a, 128b, respectively.

Figure 3A:
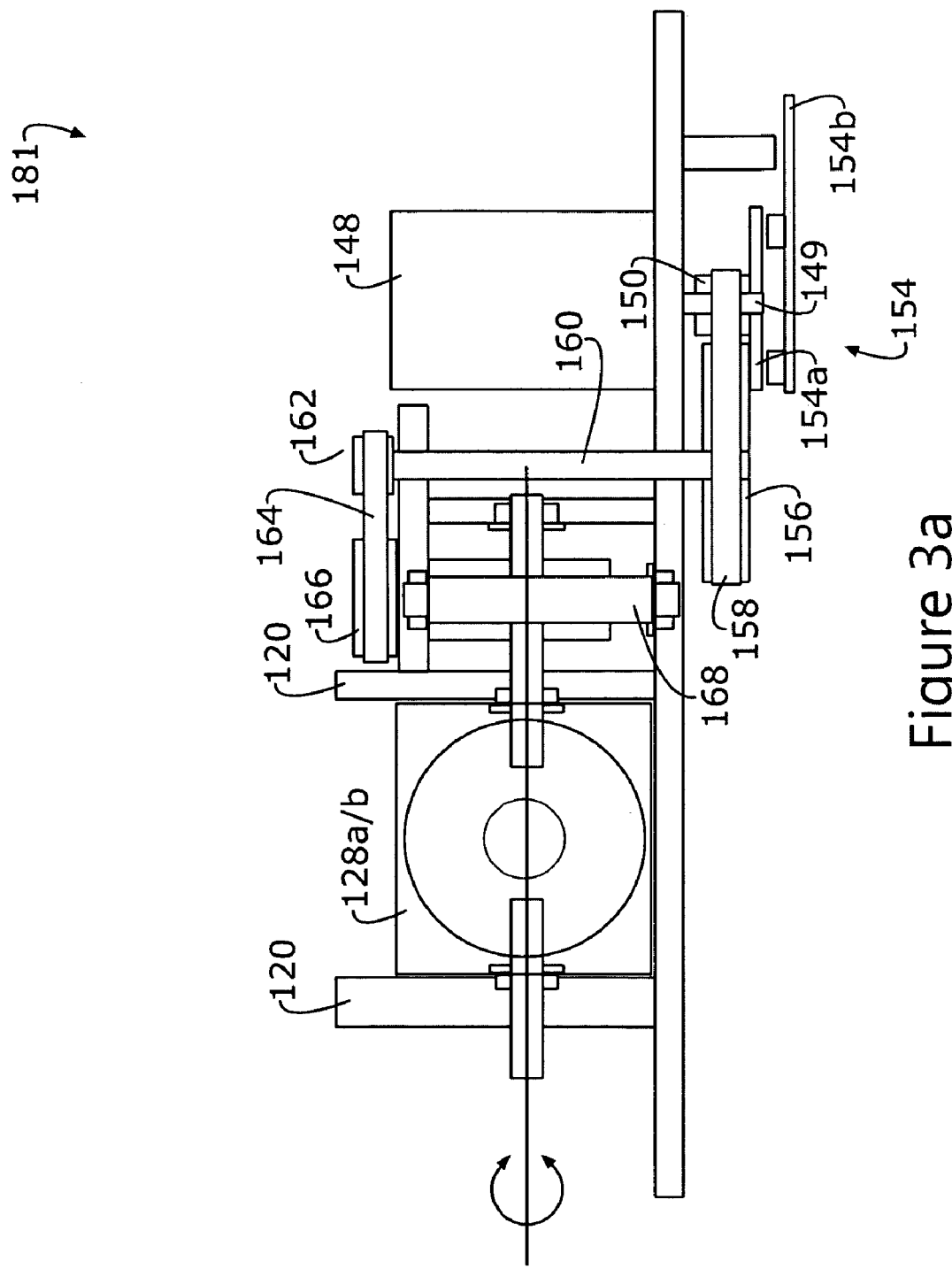
FIGS. 3a and 3b are right side and front end elevational views, respectively, of the center angle subsystem of the aircraft of the invention.
Figure 3B:
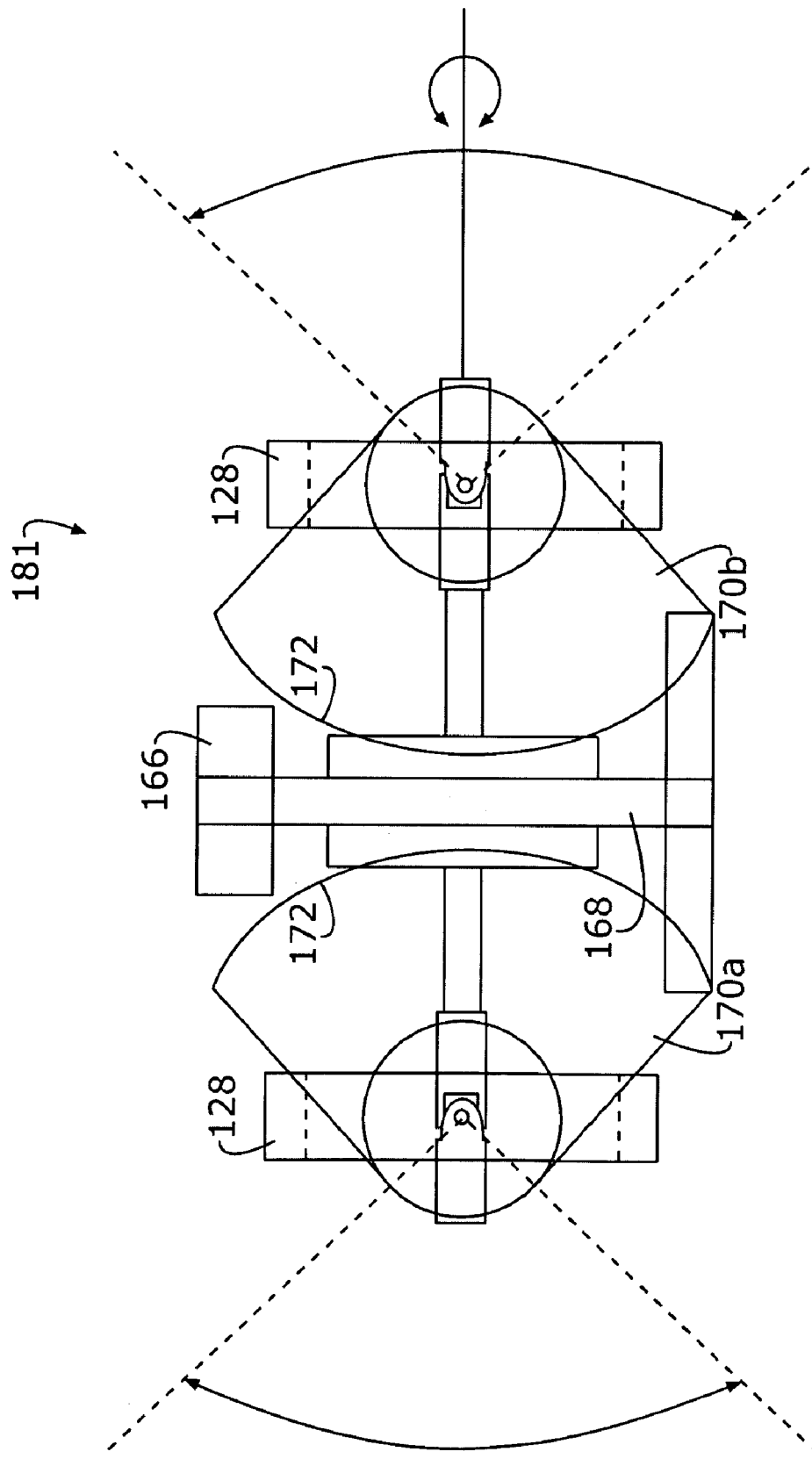
Figure 4:
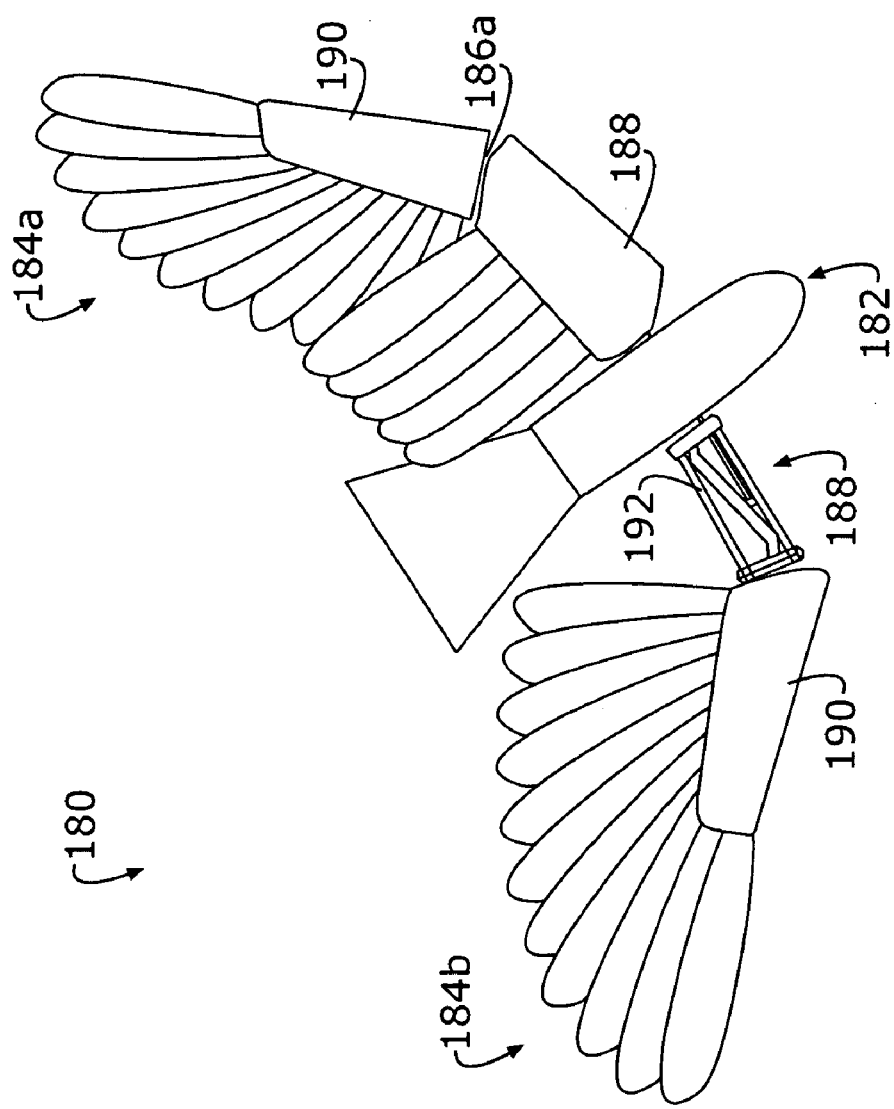
FIG. 4 is a top plan view of a prototype of a first embodiment of the aircraft of the invention.
Figure 5A:
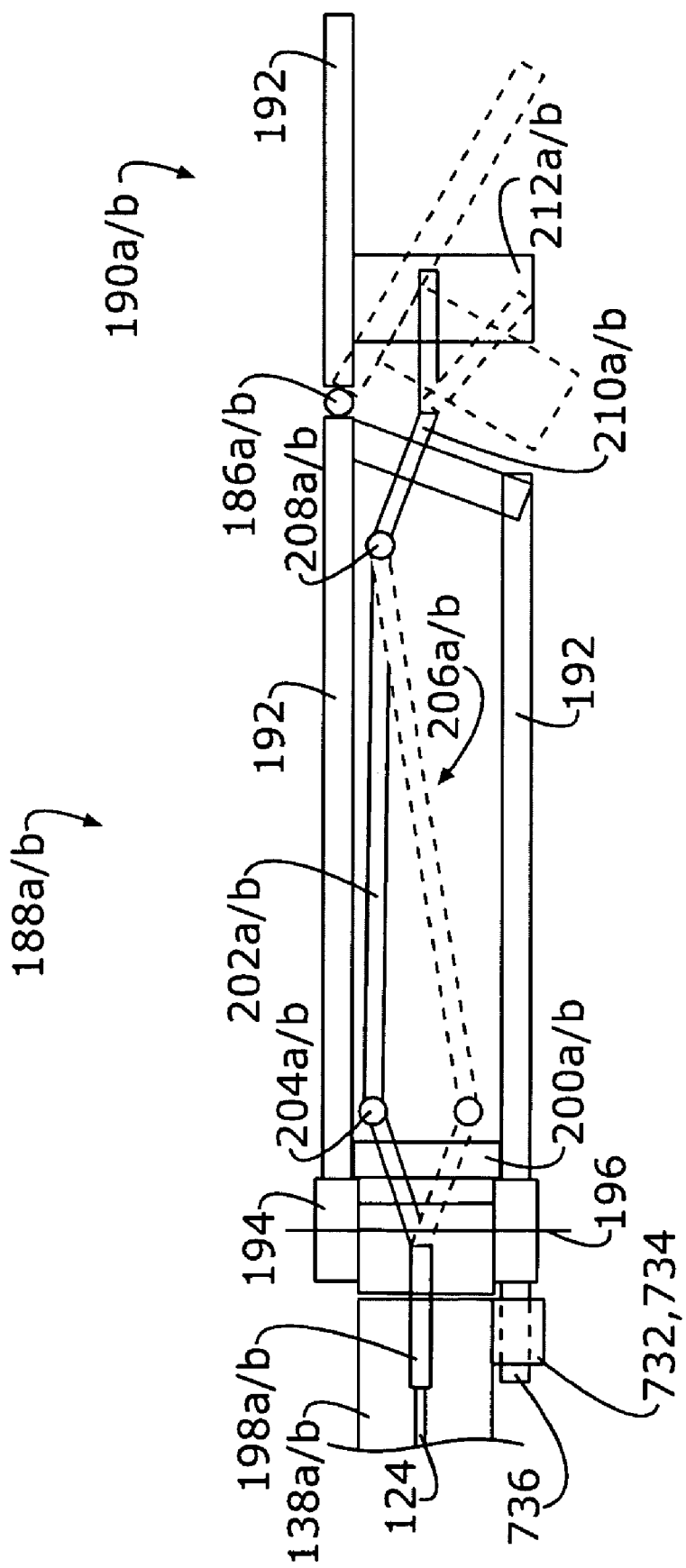
FIG. 5a is a top plan view of the internal mechanism of an inboard wing segment of the aircraft of the invention.

Referring now to FIGS. 3a and 3b, there are shown right side and front elevational views, respectively, of the center angle subsystem 181 of the aircraft 180 (FIG. 4) of the invention. Unlike the balance subsystem 121, the center angle subsystem 181 is a single-actuator system acting simultaneously to position the right and left wings 184a, 184b, respectively, of the aircraft 180 at the same angle. Though technically the wing dihedral angle, the center angle is so called because it is the midpoint of the high and low extremity of the flap stroke, determined by inner cranks 198a, 198b (FIG. 5a).

A center angle motor 148 has a downward-directed output shaft 149 that carries a first timing pulley 150. An optical encoder 154 is formed from an encoder disk 154a also attached to shaft 149 and a circuit board assembly 154b that includes a reflective photo detector. An intermediate reduction 160 aligned parallel to the output shaft 149 has a second timing pulley 156 disposed on its lower end. A lower timing belt 158 couples first timing pulley 150 and second timing pulley 156. A third timing pulley 162 is disposed at the upper end of intermediate reduction shaft 160. A fourth timing pulley 166 is disposed at the upper end of a worm shaft 168. An upper timing belt 164 connects timing pulleys 162, 166.

The relationships of the diameters of first timing pulley 150 and second timing pulley 156, third timing pulley 162 and fourth timing pulley 166, as well as the relationship of second timing pulley 156 and third timing pulley 162 disposed at opposite ends of intermediate reduction shaft 160 are chosen to provide a reduction in speed and consequent increase in torque for adjusting the center angles of wings 184a, 184b.

Left and right worm gear segments 170a, 170b, respectively, are connected to respective gimbal blocks 128a, 128b. Teeth 172 are disposed on the arcuate surface of left and right worm gear segments 170a, 170b and adapted for interaction with worm gear shaft 168.

The center angle subsystem 181 was originally designed to prevent wings 184a, 184b from striking the ground, not shown, during takeoff. However, used in conjunction with main drive motor 102 (FIG. 1), controlling the center angle also makes important contributions to stability, steering, and flap characteristic modification. For stability, the center angle subsystem 181 can position the center of mass below the center of lift, such that the body of the device 180 "hangs" below the wings 184a, 184b.

For steering, the center angle subsystem 181 enables an aileron effect. For flap modification, the center angle subsystem 181 can add to or reduce movement of the inboard wing segments 188a, 188b (FIG. 4). If performed in phase with the flap, the inboard wing segment motions provide greater range of motion, greater wing flap speed, and in general, more flapping "effort". If the center angle is moved out of phase with the flap, the motion of the inboard wing segments 188a, 188b can be decreased or cancelled by opposing movements, leaving only the outboard wing segments 190a, 190b (FIG. 4) moving. This facilitates cruising or gliding.

Referring now to FIG. 4, there is shown a top plan view of a prototype aircraft of the invention, generally at reference number 180. A central fuselage 182 contains the mechanical sub-systems. A pair of wings 184a, 184b is attached to fuselage 182 through gimbal blocks 128a, 128b (FIG. 1), shaft directors 138a, 138b (FIG. 2), and associated components described hereinabove. Wings 184a, 184b are articulated at ball joints 186a, 186b, respectively. Ball joints 186a, 186b separate wings 184a, 184b into inboard wing portions 188a, 188b and outboard wing portions 190a-190b, respectively. Wings 184a, 184b generate the flap strokes that provide lift and propulsion to the aircraft 180.

Wings 184a, 184b have a framework 190 containing linkage mechanisms described in detail hereinbelow. The framework 190 is surrounded by a covering shaped to form an airfoil.

Referring now also to FIG. 5a, there is shown a top plan view of the internal mechanism of right inboard wing segment 188a. It will be recognized that although only right inboard wing segment 188a is shown for purposes of disclosure, left inboard wing segment 188b, not shown, is a mirror image thereof.

A wing bearing 194a, 194b is pivotally attached to an outboard portion of shaft director 138a, 138b. Wings 184a, 184b, therefore, may rotate around the pivot point 196. Wing bearings 194a, 194b support wing frame members 192 that extend outwardly therefrom.

Proximal ends of inner cranks 198a, 198b are connected to main shaft 124 emerging from shaft directors 138a, 138b. Inner cranks 198a, 198 move within scotch yokes 200a, 200b to impart flapping motion to wings 184a, 184b. The distal ends of inner cranks 198a, 198b are connected to telescoping drive shafts 202a, 202b by inner universal joints 204a, 204b, respectively. The excursion of telescoping drive shafts 202a, 202b is indicated by the broken line representation 206a, 206b.

Outer universal joints 208a, 208b are disposed at distal ends of telescoping drive shafts 202a, 202b, respectively, near the outermost ends of inboard wing segments 188a, 188b near ball and socket joints 186a, 186b, respectively. Ball and socket joints 186a, 186b are used to connect outboard wing segments 190a, 190b to respective inboard wing segments 188a, 199b while allowing great freedom of motion of the latter with respect to the former.

Proximal ends of outer cranks 210a, 210b are connected to telescoping drive shafts 202a, 202b at outer universal joints 208a, 208b. Outer cranks 210a, 210b interact with second scotch yokes 212a, 212b attached to outboard wing segments 190a, 190b, respectively. Rotation of outer cranks 210a, 210b in cooperation with second scotch yokes 212a, 212b impart an independent flapping and fanning motions to outboard wing segments 190a, 190b.

Figure 5B:
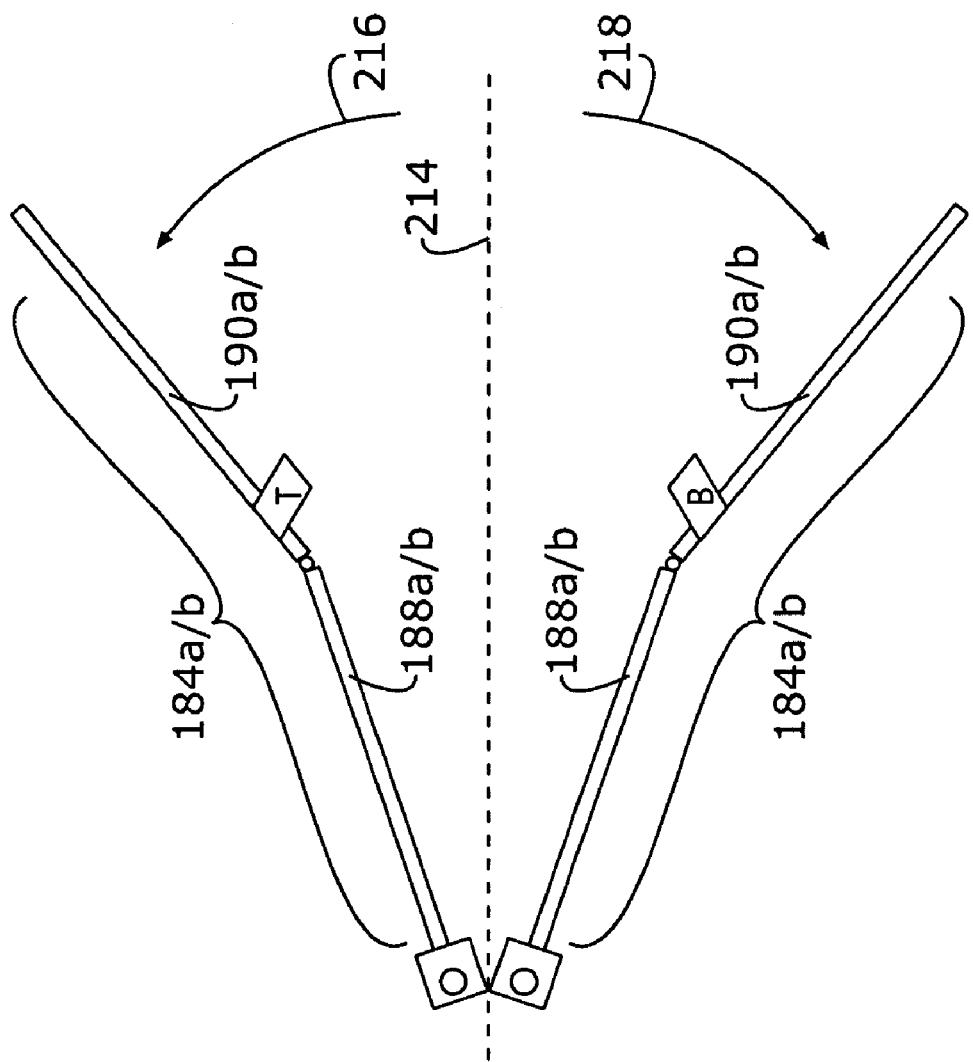
FIG. 5b is a rear, elevational, schematic representation showing the relationship of inboard wing segments and respective outboard wing segments during both upward and downward strokes of the inboard wing segments.

Referring now also to FIG. 5b, there is shown a rear, elevational, schematic representation of the relationship of inboard wing segments 188a, 188b and respective outboard wing segments 190a, 190b during upward and downward strokes of inboard wing segments 188a, 188b. Reference line 214 represents a neutral or substantially horizontal position of inboard wing segments 188a, 188b. Arrows 216 and 218 indicate an upstroke and a downstroke, respectively of wings 184a, 184b. During an upstroke, outboard wing segments 190a, 190b are pitched upward relative to inboard wing segments 188a, 188b. Conversely, during a downstroke, outboard wing segments 190a, 190b are pitched downward relative to inboard wing segments 188a, 188b. In addition, fanning subsystem, described in detail hereinbelow, provides a fanning motion to wings 184a, 184b.

Figure 6A:
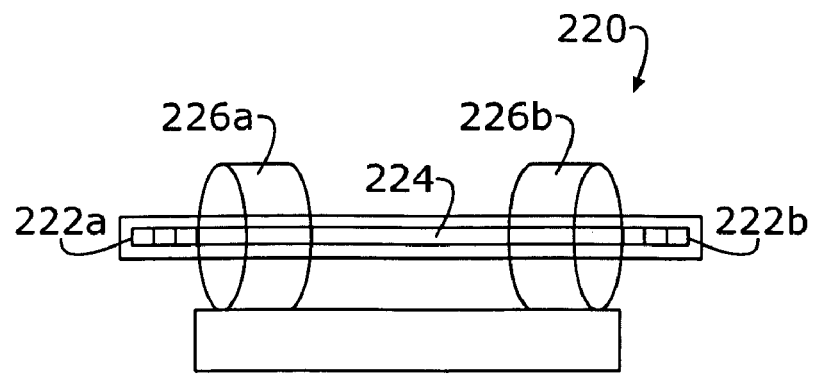
FIGS. 6a-6c, are end elevational, top plan minimum configuration, and top plan maximum configuration schematic views, respectively, of a tail assembly of the aircraft of the invention.
Figure 6B:
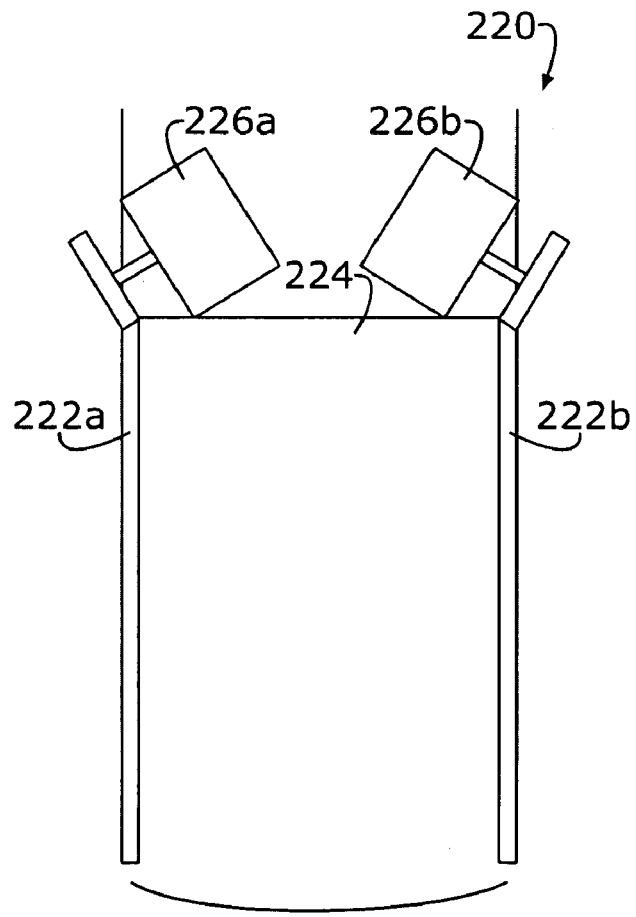
Figure 6C:
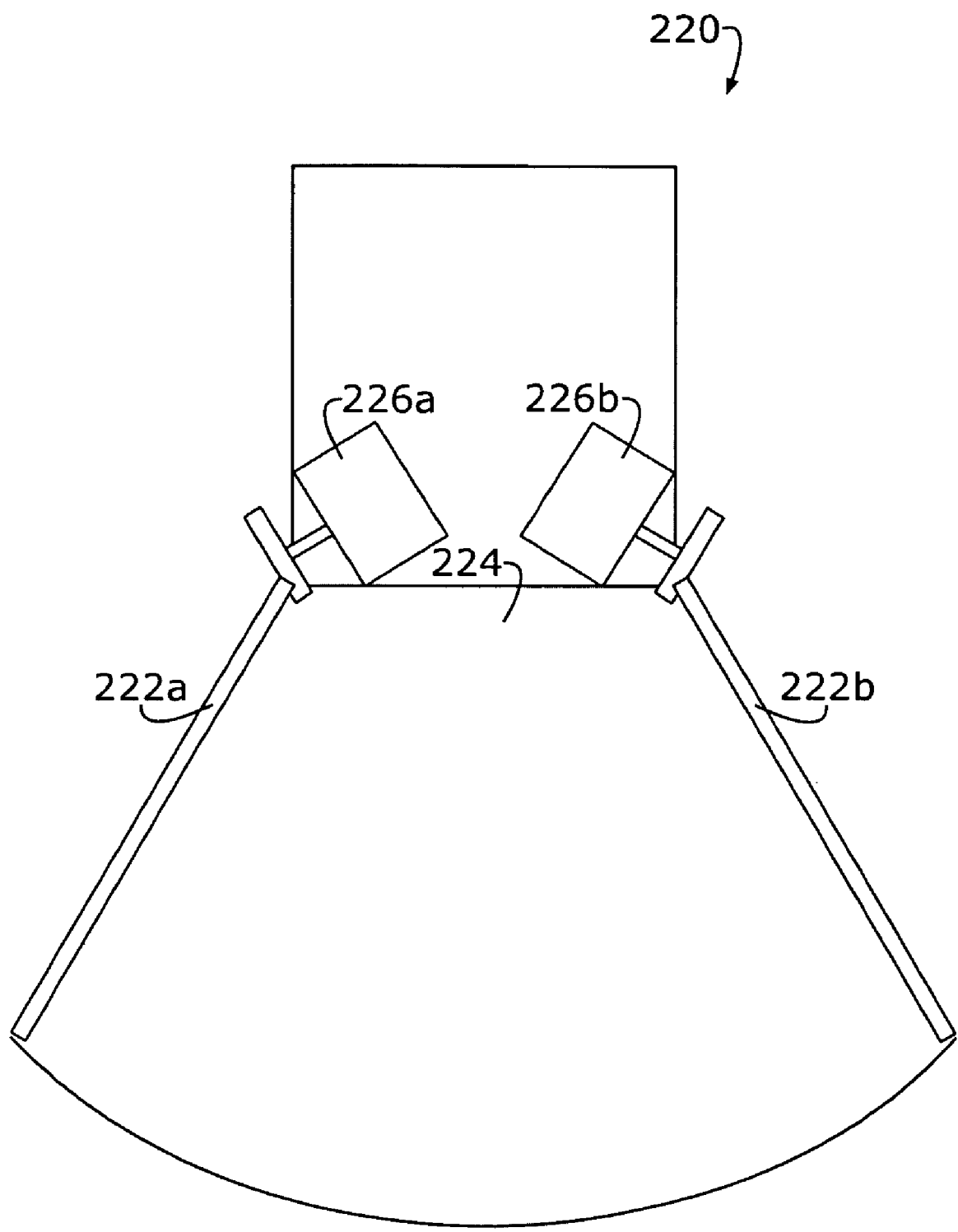

Referring now to FIGS. 6a, 6b, and 6c, there are shown a rear elevational view (FIG. 6a) and top plan views with tail frame members 222a, 222b in a minimum pitch (FIG. 6b) and with frame members 222a, 222b disposed at opposite extremes (FIG. 6c) of the tail mechanism 220 of the aircraft 180 of the invention. Tail 220 provides supplemental control to the aircraft 180 the position of tail 220 can affect pitch, airspeed, lift and stability. In addition, tail assembly 220 aids in turning (i.e., steering) the aircraft 180.

Figure 6D:
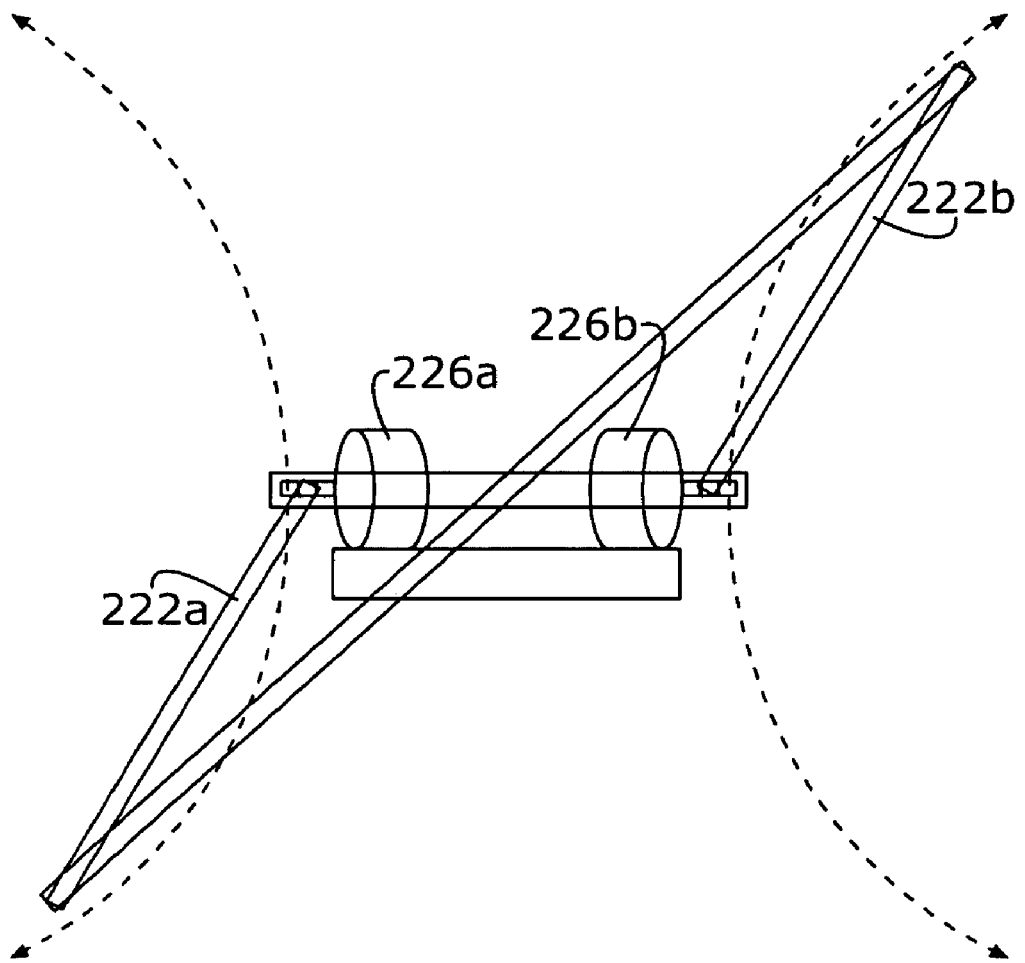
FIG. 6d is a rear, elevational, schematic view showing the range of motion of the tail assembly of FIGS. 6a-6c.

Left and right tail frame members 222a, 222b are attached to respective, opposite sides of an elastic or sectioned tail plane 224. A pair of stepper motors 226a, 226b is disposed with a small angular offset from the major axis of the aircraft 180. Stepper motors 226a, 226b are operatively attached to respective left and right tail frame members 222a, 222b. Left and right tail frame members 222a, 222b are each also disposed at an angle relative to the shafts, not separately identified, of respective stepper motors 226a, 226b such that the movement of left and right tail frame members 222a, 222b describes a conical pattern as stepper motors 226a, 226b rotate. The extremes (i.e., left down/right up vs. right down/left up) of this conical pattern may be seen in FIG. 6d.

FIG. 6b shows tail frame members 222a, 222b in a minimal state (i.e., with elastic tail plane in its most compressed configuration). FIG. 6c shows tail frame members 222a, 222b in extreme left and right positions resulting in a maximally expanded configuration of tail plane 224.

Referring now to FIGS. 7a-7d there are shown schematic illustration of a typical bird wing during a flapping motion.

Figures 7A, 7B, 7C, 7D:
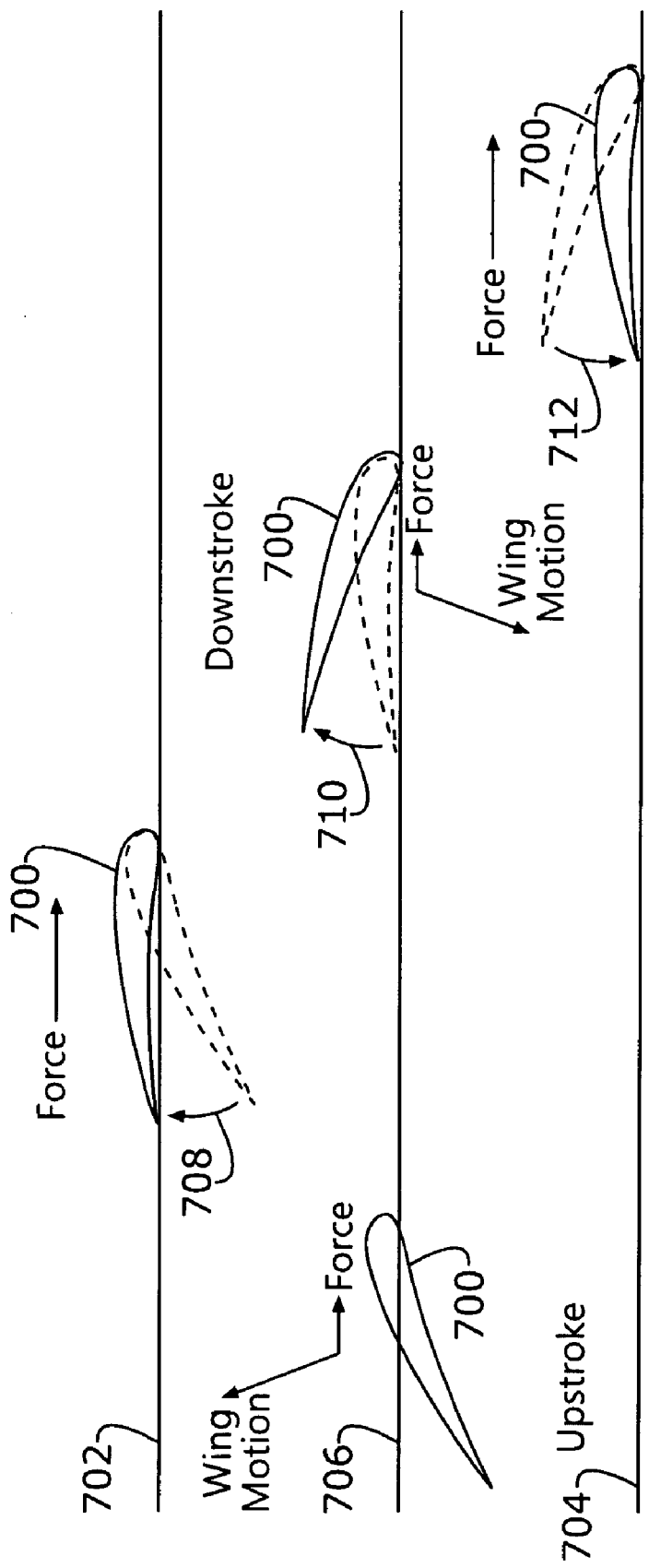
FIGS. 7a-7d are schematic representations of the fanning motion of a wing during a flap stroke.

In FIG. 7a, wing 700 is shown in an upstroke at a midpoint 706, approximately half way between an upper positional extreme 702 and a lower positional extreme 704. Wing 700 is disposed at an upward angle to present a larger amount of a lower surface to oncoming air.

In FIG. 7b, wing 700 has reached the upper extreme 702 of its upstroke. Wing 700 has moved to a substantially level orientation as shown by arrow 708.

In FIG. 7c, wing is in a down stroke at approximately a midpoint 706. Wing 700 has self-aligned upward as shown by arrow 710.

In FIG. 7d, wing 700 has reached lower extreme position 704 of its stroke and is again inclined substantially horizontally, its movement being shown by arrow 712.

Figure 7E:
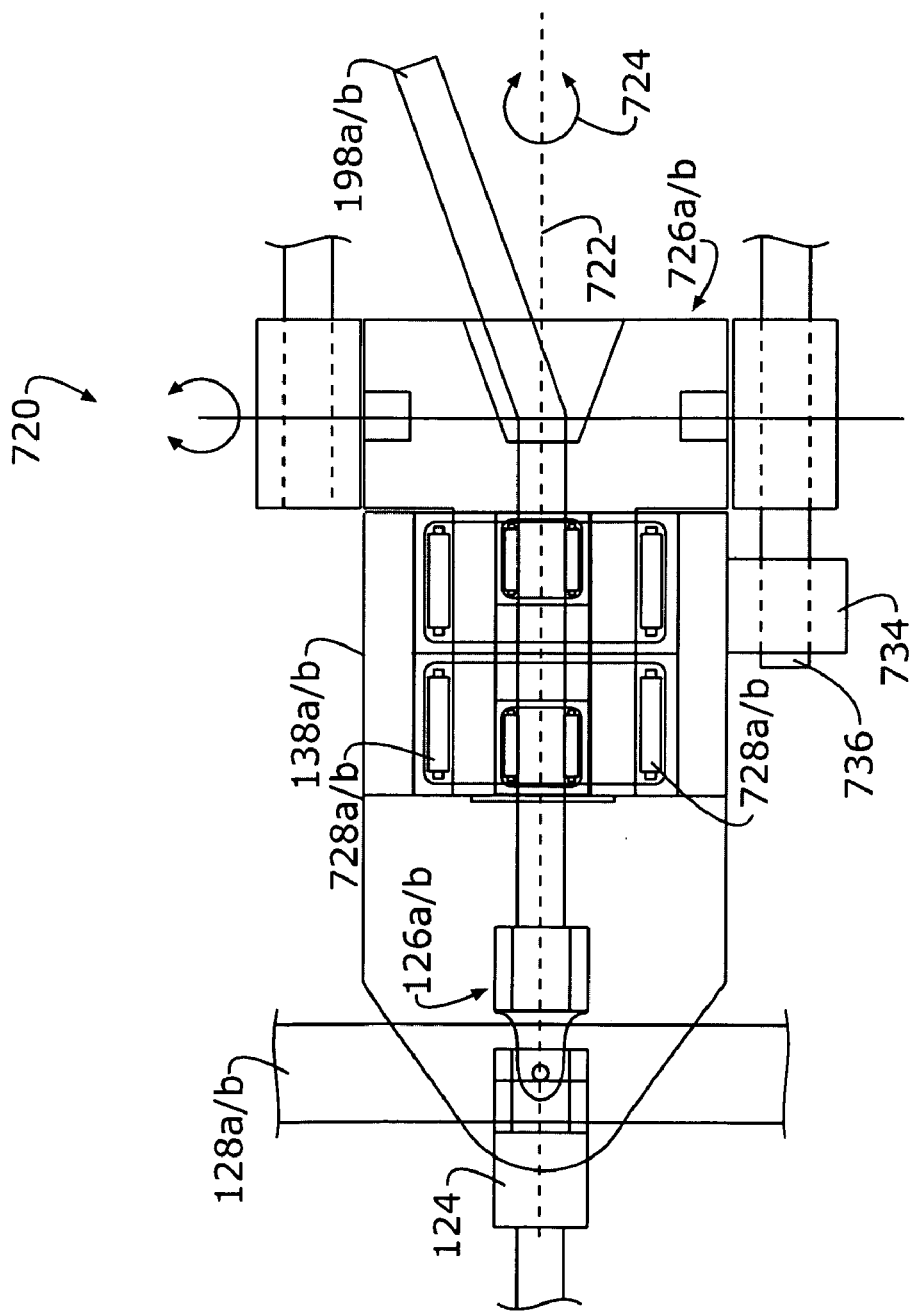
FIG. 7e is a detailed, schematic, top-plan view of a portion of the shaft director of the wing mechanism of the invention.

In the embodiment of the present invention chosen for purposes of disclosure, while moving between flap stroke upper and lower extremes 702, 704, the wings 184a, 184b (FIG. 4) are free to rotate on around their longitudinal axes in response to the relative airflow past wings 184a, 18bb. Referring now also to FIG. 7e, there is shown a detailed, top, plan view of the fanning subsystem 720.

The distal (i.e., outer) end portion 726a of wing director 138a is free to rotate around a longitudinal axis 722 as shown by arrow 724. Roller bearings 728a separate distal end portion 726a from stationary portion 730a of wing director 138a. An inwardly-directed wing frame extension 736 is free to move between upper and lower stops, shown schematically as projecting members 732a, 734a, respectively. In other words, upper and lower stops 732a, 734a limit the downward and upward rotation of outer portion 726a that is ultimately translated to fanning motion of wing 184a.

As wings 184a, 184b are moved upward and downward (i.e., flap), the 184a, 184b wings respond to the air flowing by. To the extent allowed by the mechanism, specifically upper and lower stops 732a, 734a. At the top of the flap stroke, the wing frame extension 736 encounters its upper stop 732a, forcing wing 184a to be fanned upwards, thereby imparting a thrust force. As shown schematically in FIG. 7b, wing 184a is again free to rotate and self-align with relative air flow. At the bottom of stroke, the wing frame extension 736 encounters its lower stop 734a, wing 184a is fanned downwards (as shown schematically in FIG. 7d) thereby, imparting another thrust impulse.

During the transitions between upper and lower extremes (FIGS. 7a, 7c), a forward force component is generated by the movement of the wing 184a. This forward force component is generated in a manner similar to the manner in which a traditional aircraft propeller imparts a force component to a conventional, fixed-wing aircraft. However, in the case of the ornithopter of the invention, the rotational direction and pitch of such force components reverse. As a consequence of the wing pivot axis (and entire wing 184a, 184b) rotating at shaft director 138a, 138b, the path of motion of the wing tip assumes the "figure eight" pattern that can be seen in slow motion renderings of live birds.

The gap between upper and lower stops 732, 734 causes the fanning motion to occur largely near the top and bottom of the flap stroke. While shown as a fixed gap in the embodiment chosen for purposes of disclosure, it will be recognized that in other embodiments to may be desirable to vary the gap during flight. It should be noted that some fanning would still occur with no gap. However, in this case the fanning occurs at the flap stroke speed, and throughout the entire stroke.

Even though a fixed gap helps provide a powerful flap, there is at least one drawback. With a fixed gap the wing pitch can never be locked relative to the body of the vehicle. This makes gliding difficult because the angle of incidence of the wings is not completely predictable. However, this disadvantage may be partially overcome by control of the tail.

The aircraft 180 may be equipped with retractable legs (i.e., a retractable landing gear), not shown. To aid in take off, the legs/landing gear may be spring loaded so that, upon command, a mouse trap-like mechanism, not shown, may be utilized to catapult the aircraft 180 upward. This action must be coordinated with the flap to avoid tip over or other destructive movement of the aircraft 180 upon release of the spring mechanism. In other embodiments, the legs/landing gear may be retracted using an activator such as an electric or hydraulic motor, not shown, as is well known in the aircraft art.

Each of the sub-systems., particularly main drive motor 102 (FIG. 1a), left and right stepper motors 130a, 130b (FIG. 2), center angle motor 148 (FIG. 3a) and tail stepper motors 226a, 226b (FIG. 6b) are electronically controlled. Each of the subsystems built around these motors 102, 130a, 130b, 148, 226a, and 226b contain necessary control components such as encoders or other sensors to facilitate such control. As hardware and techniques for implementing such control are believed to be well known to those of skill in the art, neither is specifically described in further detail herein.

Figure 8:
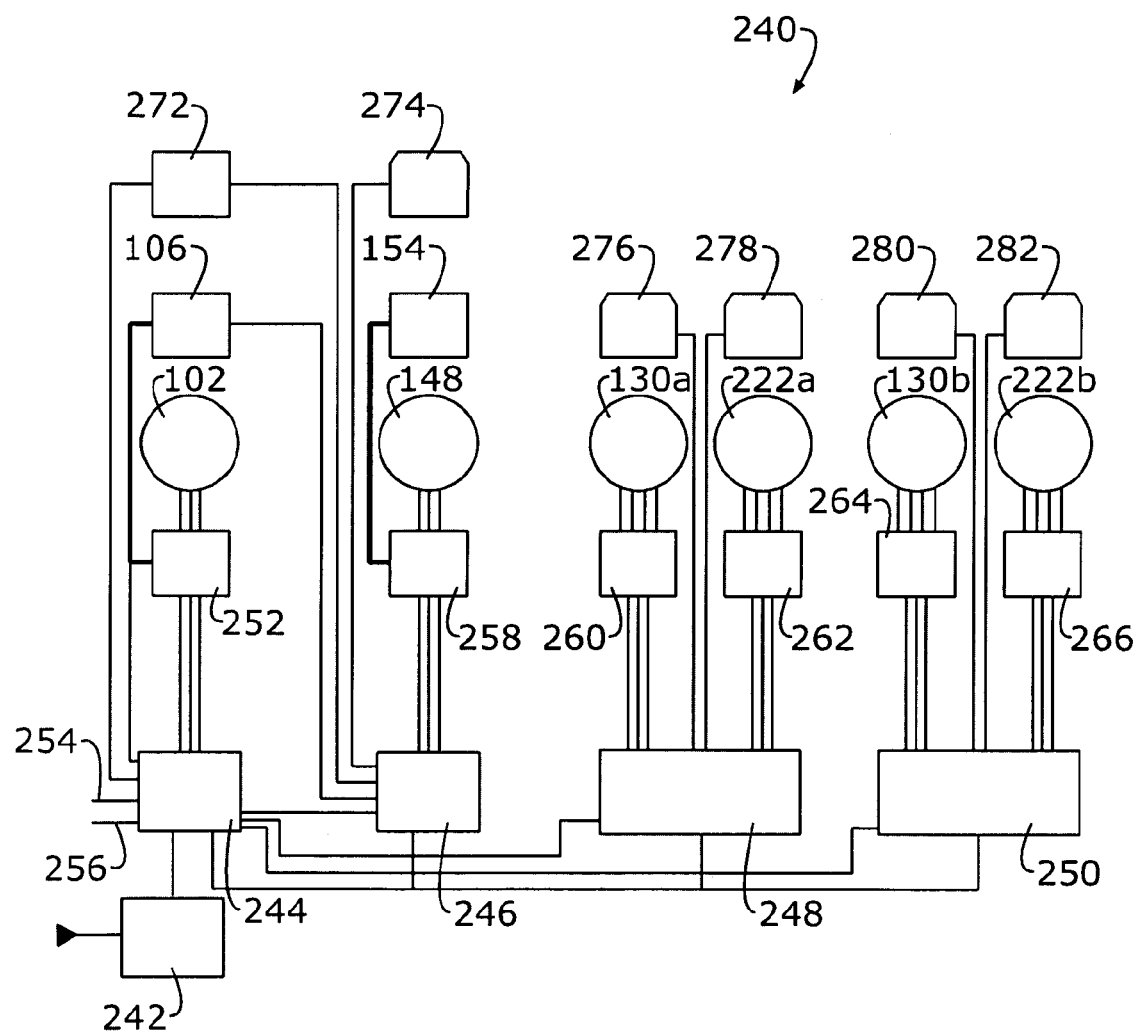
FIG. 8 is a high-level, system, schematic block diagram of the electronic control system of the aircraft of the invention.
Figure 9:
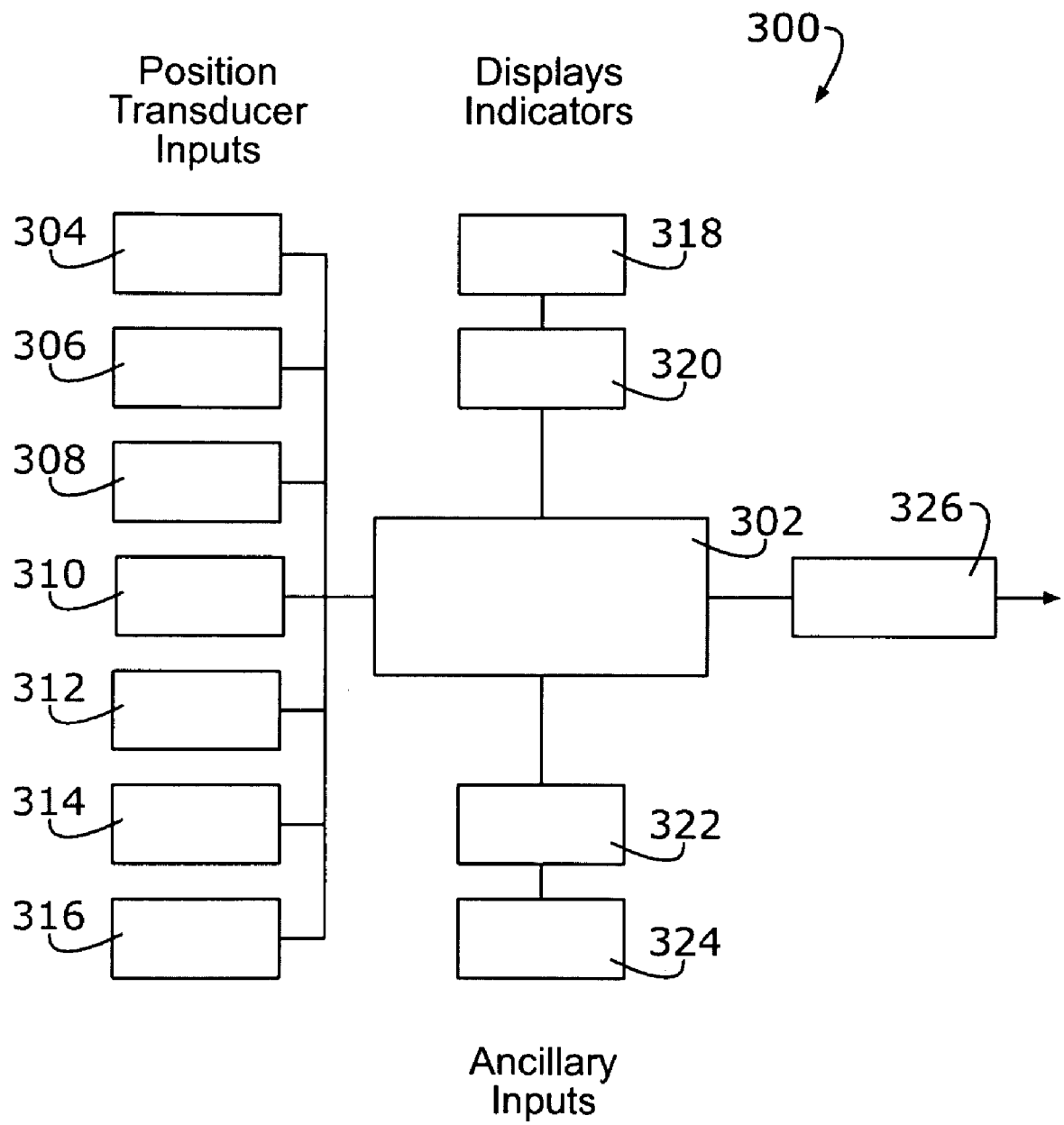
FIG. 9 is a high-level, system, schematic block diagram of a remote controller suitable for interacting with the system of FIG. 8.

Referring now to FIG. 8, there is shown a high-level system block diagram, generally at reference number 240. A radio receiver 242 receives a stream of control information from a remote controller 300 (FIG. 9). Receiver 242 is connected to the main microcontroller 244. Main microcontroller 244 is connected to center microcontroller 246, right microcontroller 248 and left microcontroller 250. In addition, main microcontroller 244 is connected to main motor electronic speed controller 252 that is, in turn connected to main drive motor 102. In the embodiment chosen for purposes of disclosure, multiple microcontrollers 244, 246, 248, 250, 252, 258 are used. One reason for using multiple microcontrollers is that the amount of I/O necessary to control the aircraft 180 would otherwise require a very large, single microcontroller. Using the many smaller microcontrollers 244, 246, 248, 250, 252, 258 allows scaling the number of microcontrollers to meet specific control needs. In addition, multiple microcontrollers allows parallel and/or distributed processing thereby allowing control code to be executed on more than one microcontroller to simultaneously provide complex control of the various sub-system described hereinabove. This results in a more powerful overall system that can multi-task with ease with the controllers running at a relatively low clock rate. In the embodiment chosen for purposes of disclosure, a clock rate of 20 MHz has been found satisfactory.

Main microcontroller 244 is also directly connected to a temperature and power monitoring and control sub-system, not shown, via connection 254 and to the leg/landing gear sub-system, not shown, via connection 256.

Center microcontroller 246 is connected to center angle electronic speed controller 258 that is, in turn, connected to center angle motor 148.

In the embodiment chosen for purposes of disclosure, electronic speed controllers 252, 258 each incorporates an additional microcontroller not specifically identified by reference number.

Right microcontroller 248 is connected to bipolar drivers 260, 262 connected respectively to left wing stepper motor 130a and left tail stepper motor 222a. Likewise, left microcontroller 250 is connected to bipolar drivers 264, 266 connected respectively to right wing stepper motor 130b and right tail stepper motor 222b.

System 240 includes numerous ancillary devices such as photo commutators 106 154 operatively connected to main drive motor 102 and center angle drive motor 148, respectively. In addition, numerous sensors such as flap index sensor 272, center angle sensor 274, wing left angle sensor 276, tail left angle sensor 278, wing right angle sensor 280 and tail right angle sensor 282 are connected to respective controllers 244, 246, 248, 250 to provide positional feedback thereto.

Referring now also to FIG. 9, there is shown a high-level system block diagram of a typical controller (i.e., controller/transmitter) suitable for remotely operating the inventive aircraft 180, generally at reference number 300. As is shown in FIG. 8, the ornithopter of the invention utilizes six microcontrollers 244, 246, 248, 250, 252, 258 in the body or fuselage of the aircraft 180. An additional microcontroller 302 is provided in controller 300. Controller 300 contains a plurality of control inputs, for example, main power 304, center angle 306, right balance 308, left balance 310, right tail 312, left tail 314 and effort 316 controls. In addition, controller 300 contains indicators 318 and/or displays 320. Controller 300 may also have a built-in or remote keyboard 322 as well as additional switch inputs 324.

All control inputs 304-316, indicators 318, displays 320, keyboard 322, and switch inputs 324 are operatively connected to microcontroller 302, which is connected to a transmitter 326. In operation, controller/transmitter 300 receives operator control input from position control inputs 304-316 and, optionally, keyboard 322 or switch inputs 324 and builds an information packet. The information packet is passed to transmitter 326 for transmission to the aircraft 180. Typically, serial data transmission is used. It will be recognized that many other data transmission schemes are known to those of skill in the art and the invention is not limited to any particular data transmission method or protocol. The packets contain digitally proportional settings for the main motor power level, the center angle position, the left and right balance servo positions, and the left and right tail servo positions. The information can be left raw, to operate everything independently, or "blended" in the remote so that the operator needs to be concerned only about speed, altitude and direction.

Keyboard 322 may be used to select and set up stored parameters and for test and demo control.

Radio receiver 242, if required, may re-digitize the information packets and pass them to main microcontroller 244. Main controller 244 uses routing numbers in the code packets to pass information to destination controllers, 246, 248, 250, 252, 258 over a simple network topology not specifically identified. Such interconnection/networking strategies are believed to be known to those of skill in the art and are not described in additional detail herein.

Individual microcontrollers 246, 248, 250, 252, 258 use the information from the packets to perform their assigned (i.e., pre-programmed) tasks. These microcontrollers use positional feedback to operate associated motors 102, 148, 122a, 122b, 130a and 130b in a servomechanism mode. The microcontrollers 246, 248, 250, 252, 258 may also have extra I/O lines to monitor motor temperatures, battery temperature and power condition or other system needs as required.

Typical pre-programmed tasks assigned to microcontrollers 246, 248, 250, 252, 258 include: receiving radio input, using photo encoders to commutate motors 102, 148; using at least one photo detector 272 to track flap position; controlling power levels to and rotation direction of motors 102, 148; controlling stepper motors 122a, 122b, 130a, 130b; measuring analog voltages from the center angle sensor 274, balance sensors 276, 280 and two tail angular position sensors 278, 282; and communicating internally with others of microcontrollers 246, 248, 250, 252, 258 to coordinate flight operations.

The overall operating system, not shown, has some special features. For example, the operating system can detect loss of the radio link and automatically configure a best glide-to-crash configuration. The operating system chosen for purposes of disclosure has different modes: power on self test/system initialization; powered flight; shipping/storage; and setup to determine and store motion limits, for motion demonstration, and for testing.

In operation, the main drive subsystem uses energy from a power source such as lithium polymer batteries, not shown, to energize main motor 102 to provide power to drive the flapping motion of the wings 184a, 184b. Refer again also to FIG. 1. Through suitable speed reduction provided by toothed pulleys 104, 110 and timing belt 108, power from the main motor 102 reaches the main drive shaft 124 disposed perpendicular to the major axis of the aircraft 180. In the embodiment chosen for purposes of disclosure, a worm gear arrangement 112, 114 is chosen to provide bilateral-symmetry, high reduction ratio, small size and or weight, and for preventing the wings 184a, 184b from backdriving motor 102. Main motor 102 is positioned low in the frame for stability. High torque output (comparable to a cordless drill/screwdriver) from the main shaft 124 is directed through gimbals 128a, 128b using suitable joints (universal, constant velocity (CV), or other) 126a, 126b, where the power is available to the wings 184a, 184b in whatever direction they happen to be pointed relative to the fuselage 182 (FIG. 4). Applied power from main motor 102 determines the flap rate. Power from motor 102, therefore, controls altitude and speed of the aircraft 180.

The brushless DC main motor 102 is controlled by a dedicated microcontroller 252 coupled to a three-phase transistor half bridge, not shown. An optical encoder 106 is used for motor commutation. A brushless DC motor (BDCM) 102 is chosen for its high power to weight ratio and high rotational speed, typically in the 33,000 RPM range. In the embodiment chosen for purposes of disclosure, main motor 102 can produce approximately 180 watts of output power. Because of the high volume of processing required, the dedicated microcontroller 252 is operated as a peripheral of main microcontroller 244. A pulse width modulated signal, not shown, from the main microcontroller 244 interrupts the motor control code. This signal is logically combined with the active half bridge to set motor power level.

The shaft directors 138a, 138b of the main drive shaft 124 are positioned by servo actuators 130a, 130b and associated mechanisms to modify flap and balance characteristics. Each axis of the gimbal 128a, 128b is controlled by a separate actuator. Microcontrollers 248, 250 monitor and coordinate the actuators, allowing the balance of forces in the system to be manipulated in several important ways.

Motion on the gimbal blocks 128a, 128b vertical axis (balance) is independent for the left and right wings 184a, 184b. Servo motors 130a, 130b turn lead screws 132a, 132b coaxial with the gimbal horizontal axis. This method is used so that the lead screws 132a, 132b do not change position relative to wing 184a, 184b and gimbals 128a, 128b, regardless of the aiming of wings 184a, 184b thereby simplifying the design. Servo motors 130a, 130b and lead screws 132a, 132b, therefore, rotate along with the respective gimbals 128a 128b.

Servo lead screws 132a, 132b are connected to the wing shaft directors 138a, 138b through balance links 136a, 136b. When actuated together, balance actuators move the wings 184a, 184b, and consequently the center of balance of the body, forward and backward along the major axis of aircraft 180 to control pitch and angle of attack of wings 184a, 184b. During takeoff, the lift and thrust vectors are rotated by moving the center of balance such that the sum of these forces is maximized for leaving the ground and hovering. In flight, pitch controls airspeed.

Used alone, balance actuators create a lateral asymmetry that causes directional changes, dependent on flight mode. For example, if, during level unpowered flight (gliding) the right wing 184a is moved forward relative to the left wing 184b, the aileron effect causes a coordinated turn to the left as a result of nothing more than the relative positions of wings 184a, 184b as determined by the instant positions of gimbals 128a, 128b and shaft directors 138a, 138b (assuming the aircraft center angle is not zero).

It may be helpful to envision the way a Frisbees toy wheels around when thrown into the wind.

However, if while flapping, as previously discussed, the direction of thrust from a wing 184a, 184b is into the line of flight, this pushes the aircraft 180 in the direction of the turn.

An aileron effect occurs whenever a wing 184a, 184b is raised or lowered relative to the centerline and the balance is thus shifted forward or aft. As this configuration described a cone or segmented cone in three dimensions, more or less of am upper or lower surface of a first of wings 184a, 184b is presented to oncoming air relative to the corresponding surface of the other of wings 184a, 184b. The result is that each wing 184a, 184b has a different angle of incidence relative to oncoming air thereby inducing the aileron effect. The aileron effect occurs with a center angle of zero during flapping, but it will be cyclic with the motion of wings 184a, 184b. If hovering and the same movement is performed, the aileron effect sets up a helical airflow to which the aircraft 180 reacts.

The wing 184a, 184b is where the flap stroke is actually generated. Torque from main motor 102 passes through the shaft directors 138a, 138b to inner cranks 198a, 198b. The motion of inner cranks 198a, 198b is translated by first scotch yokes 200a, 200b into a flapping oscillation. Pivoted on gimbals 128a, 128b, the wings 184a, 184b flap in whatever direction (up/down/fore/aft) wings 184a, 184b are aimed, relative to the aircraft 180 body, within the limits of the mechanisms. Torque from the inner cranks 198a, 198b is passed on, through telescoping shafts 202a, 202b in combination with universal joints 204a, 204b, 208a, 208b, to outer cranks 210a, 210b. At the articulation, the geometry of the ball and socket joints 186a, 186b and outer cranks 210a, 210b interacting with second scotch yokes 212a, 212b generates a complex motion (both flapping and fanning) that produces an active thrust force. The articulation allows the outboard wing segments 190a, 190b to sweep rearward if required. As seen in FIG. 7e, the rotating portion 726a, 726b of shaft directors 138a, 138b compounds the fanning motion.

Although the center angle subsystem 181 can produce flap movement, used alone, such flap movement is inefficient and cannot take advantage of articulation of wings 184a, 184b. The center angle is intended only as a modifier.

The timing of the outer crank 210a, 210b can lag or lead the timing of inner cranks 198a, 198b. The phase relationship of the cranks 198a, 198b 210a, 210b is important to flap effectiveness, comparable to shifting gears. In the embodiment chosen for purposes of disclose, neither the angle of inner cranks 198a, 198b nor the angle of outer cranks 210a, 210b is alterable, nor is the phase relationship of the cranks 198a, 198b 210a, and 210b. In alternate embodiments, control of the angle of either or both inner cranks 198a, 198b and outer cranks 210a, 210b as well as the phase relationship therebetween may be controlled. It may be envisioned that a variable-angle crank could make possible folding the wings 184a, 184b in a bird-like manner.

Refer now again to FIGS. 6a-6d. The tail assembly 220 provides supplemental flight control. Tail assembly 220 is used to affect pitch, airspeed, lift, stability, and aid in steering. Tail plane 240 is most narrow when in line with the horizontal centerline. When raised or lowered, the area of tail plane 240 increases. The motion of tail 220 provides both elevator and rudder functions by angling left/right/up/down to direct airflow. At low speed, tail 220 functions like the flaps of a conventional, fixed wing aircraft.

In still other embodiments of the inventive aircraft 180, payload such as a remote video camera or laser pointer, neither shown, may be carried, typically disposed on a two-axis active mount well known to those of skill in the art. A downlink, not shown, may be used to transmit gathered data or images from aircraft 180 to a remote receiver. An on-board video camera and downlink could enable an operator to fly the unmanned aircraft 180 even when out of sight from the operator's position.

Another useful onboard device is a sonar range detector. In the event of a lost radio link, a sonar range detector could facilitate a softer, self managed landing if impact with the ground were imminent.

A still further addition is one or more gyroscopic sensors within the aircraft 180 to enable some self control for a smoother flight.

Currently there is no provision for the aircraft 180 to control its own flight path, although this is technically possible. So enabled, the aircraft 180 could conceivably fly independently to a specified location.

The foregoing description provides a mechanism for imparting realistic, bird-like movement to wings. The embodiment chosen for purposes of disclosure is an aircraft 180 capable of sustained, remotely controlled flight. The aircraft 180 may be configured to resemble an actual bird and used for nature studies, covert observation, and other such activities.

Other possibilities for one or more of the described subsystems include amusement park rides, toys, weather vanes, whirly-gigs, decoys, displays for museums, and "props" for the entertainment and film industry, where a lifelike imitation of bird motion might fill an aesthetic or educational need.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A mechanism for imparting flapping motion to a wing, comprising:
   a) a wing;
   b) a main drive mechanism for imparting upward and downward flapping motion to said wing, said flapping motion comprising a flap stroke having an upper extremity and a lower extremity and comprising:
      i) a main drive shaft having an outboard, distal end;
      ii) at least one motor operatively connected to said main drive shaft and adapted to impart rotary motion thereto;
      iii) a universal joint having a proximal end and a distal end, said proximal end of said universal joint being operatively attached to said distal end of said main drive shaft;
      iv) a gimbal block surrounding said universal joint;
      v) a shaft director hingedly affixed to a proximal end of said wing, said shaft director being pivotally affixed to said gimbal block;
      vi) an inner crank having a proximal end and a distal end, said proximal end being operatively connected to said distal end of said universal joint; and
      vii) a first scotch yoke interactive with said inner crank and operatively attached to said wing;
   c) a center angle drive mechanism for modifying a dihedral angle of said wing relative to a longitudinal axis thereof, said dihedral angle being a midpoint between said upper extremity and said lower extremity of said flap stroke; and
   d) a balance drive mechanism for modifying a fore/aft direction of said wing.

2. The mechanism for imparting flapping motion to a wing as recited in claim 1, wherein said wing comprises an articulate wing comprising an inner wing segment and an outer wing segment pivotally attached thereto and wherein said shaft director is hingedly affixed to a proximal end of said inner wing segment, and said inner crank and said first scotch yoke are disposed within said inner wing segment.

3. The mechanism for imparting flapping motion to a wing as recited in claim 2, wherein said main drive mechanism further comprises:
   viii) a second universal joint having a proximal end and a distal end disposed proximate a distal end of said inner crank;
   ix) an outer crank having a proximal end and a distal end, said proximal end thereof being operatively connected to said distal end of said second universal joint; and
   x) a second scotch yoke interactive with said outer crank and operatively attached to said outer wing segment.

4. The mechanism for imparting flapping motion to a wing as recited in claim 1, wherein said center angle drive mechanism comprises:
   i) at least one motor operatively connected to a worm disposed substantially perpendicular to said longitudinal axis of said wing;
   ii) a gimbal block; and
   iii) a gear segment adjacent and operatively connected to said worm, said gear segment being pivotally attached to said gimbal block.

5. The mechanism for imparting flapping motion to a wing as recited in claim 1, wherein said balance drive mechanism comprises:
   i) a lead screw;
   ii) a drive motor operatively connected to said lead screw and adapted for imparting rotary motion thereto;
   iii) a lead screw follower operatively connected to said lead screw;
   iv) a shaft director; and
   iv) a balance link having a proximal end pivotally connected to said lead screw follower and a distal end pivotally connected to said shaft director.

6. The mechanism for imparting flapping motion to a wing as recited in claim 1, further comprising:
   e) a fanning mechanism for imparting a fanning motion to said wing, said fanning motion depending at least in part upon a position of said wing in said flap stroke.

7. The mechanism for imparting flapping motion to a wing as recited in claim 6, wherein said fanning mechanism comprises means for controlling said fanning motion relative to said position of said wing.

8. The mechanism for imparting flapping motion to a wing as recited in claim 7, wherein said means for controlling said fanning motion comprises at least one selected from the group: an upper stop, and a lower stop.

9. A mechanism for imparting flapping motion to a wing, comprising:
   a) an articulate wing comprising an inner wing segment and an outer wing segment pivotally attached thereto;
   b) a main drive mechanism for imparting upward and downward flapping motion to said wing, said flapping motion comprising a flap stroke comprising an upper extremity and a lower extremity, said main drive mechanism comprising:
      i) at least one motor operatively connected to a main drive shaft and adapted to impart rotary motion thereto;
      ii) said main drive shaft having an outboard, distal end and operatively connected to said at least one motor;

iii) a universal joint having a proximal end and a distal end, said proximal end of said universal joint being operatively attached to said distal end of said main drive shaft;

iv) a gimbal block surrounding said universal joint;

v) a shaft director hingedly affixed to a proximal end of said wing, said shaft director being pivotally affixed to said gimbal block;

vi) an inner crank having a proximal end and a distal end, said proximal end being operatively connected to said distal end of said universal joint; and vii) a first scotch yoke interactive with said inner crank and operatively attached to said wing;

c) a center angle drive mechanism for modifying a dihedral angle of said wing at a midpoint between said upper extremity and said lower extremity of said flap stroke, said center angle drive mechanism comprising:

i) a worm;

ii) at least one motor operatively connected to said worm disposed substantially perpendicular to a longitudinal axis of said wing;

iii) a gimbal block; and iv) a gear segment adjacent and operatively connected to said worm, said gear segment being pivotally attached to said gimbal block;

d) a balance mechanism for modifying a fore/aft direction of said wing, said balance drive mechanism comprising:

i) a lead screw;

ii) a drive motor operatively connected to said lead screw and adapted for imparting rotary motion thereto;

iii) a lead screw follower operatively connected to said lead screw;

iv) a shaft director; and v) a balance link having a proximal end pivotally connected to said lead screw follower and a distal end pivotally connected to said shaft director; and e) a fanning mechanism for imparting a fanning motion to said wing, said fanning motion depending at least in part upon a position of said wing in said flap stroke, said fanning mechanism comprising at least one selected from the group: an upper stop, and a lower stop.

10. The mechanism for imparting flapping motion to a wing as recited in claim 9, wherein said shaft director is hingedly affixed to a proximal end of said inner wing segment and said inner crank and said first scotch yoke are disposed therewithin.

11. The mechanism for imparting flapping motion to a wing as recited in claim 10, wherein said main drive mechanism further comprises:

viii) an outer crank having a proximal end and a distal end, said proximal end thereof being operatively connected to said distal end of said second universal joint; and ix) a second scotch yoke interactive with said outer crank and operatively attached to said outer wing segment.

12. An ornithopter having a pair of flapping wings, comprising:

a) an elongated fuselage having a major axis;

b) at least two wings movably attached to said fuselage;

c) a mechanism for imparting flapping motion as recited in claim 11, operatively connected to said at least two wings.

13. A whirligig or lawn ornament comprising at least one flapping wing and the mechanism for imparting flapping motion thereto as recited in claim 11.

* * * * *